3,172,628
CAR RETARDER SPEED CONTROL APPARATUS
Herbert L. Bone, Forest Hills, and David P. Fitzsimmons, Trafford, Pa., assignors to Westinghouse Air Brake Company, Wilmerding, Pa., a corporation of Pennsylvania
Filed Oct. 21, 1954, Ser. No. 463,748
16 Claims. (Cl. 246—182)

Our invention relates to car retarder speed control apparatus, and more particularily to means for automatically controlling, according to weight and rolling conditions, the speed at which a car or multiple car cut leaves a car retarder.

In railway hump classification yards where cars move down a hump track under gravity to different yard tracks, the speed a car will attain depends among other things upon the weight of the car and its contents and upon the rolling conditions such as weather and temperature. Obviously, there is a correct speed at which a car or a multiple car cut should drift into the selected yard track in order to couple to cars already standing on that track without too great an impact. The correct speed will vary according to car weight and the weather and other conditions under which switching is being done.

Car retarders for controlling the speed at which cars move from a hump to different classification tracks are provided. The degree of braking force a retarder exerts must be varied for cars of different weights and other conditions in order to obtain the correct speed for the different cars to drift into the different tracks. The total braking effort effected by a retarder is determined in part by the presssre applied by the braking bars of the retarder to the car wheels and by the length of the retarder. To obtain ample braking effort it is customary to provide a plurality of retarders in the tracks leading from the hump to the yard tracks. Since the practical length of a single retarder is limited for various reasons, two or more individual retarders may be placed end to end so that the retarder consists of two or more sections, each section having an independent brake actuating motor means and control.

In many prior installations, the operator electrically controls the retarders from a tower where he can observe the cars being humped and governs the retarders according to the speed at which the car or car cut in his judgment is moving, and in this way endeavors to have the car leave a retarder at what in the operator's judgment is a desired speed. The many factors that enter into the rolling condition of a car make it very difficult for an operator to properly judge the braking force a retarder should exert. Also, the switching of cars at a hump yard is greatly expedited and much time saved when the different car cuts can be close together so that two or more cuts are moving down the hump simultaneously. Obviously, under such speed up operation an operator does not have time to observe the speed and properly brake each individual car cut.

It has been proposed to automatically determine the speed at which a car is passing through a retarder and control the braking action of the retarder automatically according to the car speed so that it leaves the retarder at a selected speed. Under this arrangement the same fixed leaving speed is applied to all cars and since the correct leaving speed varies according to weight of the car and its contents this semi-automatic speed control alone is not sufficient. It has been proposed further to provide braking force selective means by which an operator with previous information as to the weight of a car being humped can select a condition which in cooperation with a speed measuring means control a retarder to obtain different leaving speeds. Again it has been proposed to weigh each car being humped and control the retarder according to the car weight. Furthermore, since the free running or rolling condition of a car varies according to temperature, being faster for the warmer summer temperatures and slower for the colder winter temperatures it is desirable to provide variable temperature and weather condition control at retarders.

In these car retarder control systems heretofore proposed the coordination of the many factors that enter into the control has not been entirely satisfactory.

Because of these problems in railway car retarder control a main object of our present invention is the provisions of novel and improved railway car retarder speed control means.

Another object of our invention is the provision of improved means that automatically controls car retarders to obtain leaving speeds differing according to different car weights.

Again, an object of our invention is the provision of novel and improved means which classifies the cars being switched at a hump yard into a plurality of different weight groups and automatically controls the braking force exerted by the retarders to obtain a leaving speed different for each weight group.

A further object of our invention is the provision of novel car retarder control means which determines the car weight a sufficient time in advance of the car entering a retarder that proper setting of the retarder as to its initial braking force is assured.

Another feature of our invention is the provision of improved car retarder weight speed control means for independently controlling different sections of a retarder and thereby expediting the switching of cars at a hump yard. A first and a second section of a retarder with independent motor actuating means are provided with independent controls by which a car cut approaching the first section can establish its setting while the second section is still occupied by a previous car, maintaining the previous setting of the second section.

Another feature of our invention is the provision of improved car retarder weight speed control means wherewith, for multiple car cuts or units with all the cars not in the same weight group, the retarder braking force and leaving speed setting selected for the leading car of the cut shall remain in force until a car different in weight group from the leading car is weighed whereupon the brake and leaving speed setting for the retarder shall revert to a preselected weight group setting, or if the leading car is of the preselected weight group the corresponding retarder setting shall remain in force.

A further feature of our invention is the provision of car retarder speed control means including improved means by which one set of leaving speeds is obtained under one weather condition such as high summer temperatures and a second and different set of leaving speeds is obtained under a second weather condition, such as low winter temperatures.

Again an object of our invention is the provision of improved retarder speed control means wherewith the brake and speed setting for a single car unit or for a multiple car unit when once established shall remain in force so long as any portion of the unit is in the section of the retarder in question.

Another feature of our invention is the provision of improved retarder speed control means wherewith a retarder is closed under a selected speed setting such as, for example, a medium speed setting, when no car is in the retarder and none approaching.

Another object of our invention is the provision of improved car retarder control means wherewith the braking effort of the various sections of a retarder are adjusted to decelerate or accelerate the car speed gradually so that the car cut arrives at the leaving end of the final retarder section at the desired leaving speed without having traveled any appreciable distance through the retarders at that speed. This reduces wear on the retarders and cars, lessens the chance of damage to lading, and permits faster operation.

Another object of our invention is the provision of improved car retarder control means wherewith each section of a multiple section retarder is provided with an independent set of leaving speeds.

Other objects, features and advantages of our invention will be apparent as the specification progresses.

Briefly described, apparatus embodying our invention comprises a car weight determining means, a car speed measuring means, a braking force speed selective means, a temperature selective switching means, and weight register and weight storage relay groups together with control circuit networks. These several means are connected to the different relay groups in such a manner as to translate the different positions of the car weight, speed and temperature devices into different predetermined braking conditions of the car retarders. The weight of a car and its contents is measured by the weight determining means just ahead of the retarder to be controlled, and a group of register relays selectively energized to differentiate between different weight groups. For example the cars may be classified into three weight groups, (1) light, less than 40 tons (20 ton minimum); (2) medium, 40 to 60 tons; and (3) heavy, over 60 tons.

This registered weight is further translated by various circuits to store the weight information by selectively energizing a group of relays for each retarder section to be controlled. These relays by the manner in which they are energized, select a high, medium or low leaving speed for that retarder section, for light, medium or heavy weight cars, respectively. Two such storage relay groups are provided for each retarder section but only one group used at a time. Selection between the two storage relay groups is made by the temperature switching means, a first one of the two groups being used under high temperature conditions and a second one of the relay groups being used under low temperature conditions.

The speed measuring means repeatedly measures the speed of a car as it passes through the retarder section. The speed measuring means jointly with the weight storage relays selectively set up different control circuit arrangements of the braking force speed selective means and through these circuit arrangements control the brake actuating motor of the retarder section to bring about an initial braking force, a partial braking force and full release as necessary to gradually and uniformly brake the cars so that the desired speed at which the car unit should leave the retarder is obtained.

The speeds at which partial braking force reduction and full release occur differ as between the various retarder sections so that the deceleration or acceleration of a car cut is gradual and uniform and the desired leaving speed is obtained without the car cut traveling the retarder any appreciable distance at the leaving speed. In general the leaving speeds selected for the earlier retarder sections of a multiple section retarder are higher than those selected for the last section. However, when a master retarder is located close to the crest of the hump, the car cuts may require acceleration and their speed increased and at such a location the selected leaving speeds for the first retarder section would be lower than the leaving speeds desired for the last section. By way of illustration and as an aid in understanding the apparatus embodying our invention the desired leaving speeds for the final retarder section might be 12, 9 and 7 miles per hour for light, medium and heavy weight cars, respectively, under a first or a high temperature switching; and 15, 12 and 10 miles per hour for light, medium and heavy weight cars, respectively, under a second or low temperature switching. Using these assumed leaving speeds for the last retarder section, the leaving speeds for the first section of a two section retarder might be 2 to 3 miles per hour higher for each car weight group, while at a master retarder the leaving speeds for the first section might be 2 to 3 miles per hour lower than the leaving speeds selected for the last retarder section. The apparatus provided according to our invention by its independent control of each retarder section can readily be set to obtain these variations in the leaving speeds for the different sections and thereby obtain gradual and uniform deceleration or acceleration for the car cut.

If a multiple car cut contains cars of the different weight groups the leaving speed selection may be automatically shifted to that selected for the medium weight group, if originally established otherwise by the first or leading car of the cut, and thereafter maintained at this medium weight setting for the cut. Under this arrangement the first section of the retarder is made of sufficient length that the longest car will not span it. Also provision is made to distinguish between multiple car cuts and closely following single car cuts.

As here contemplated the apparatus is normally set for the retarder sections to be closed under medium weight conditions, i.e., with no car in the retarder and none approaching. However, the circuits and apparatus can just as readily be set for the retarder sections to be normally open, this normally open retarder being desirable at some locations.

Provision is made in the circuits to maintain the leaving speed selection while a car cut is passing through a second or later retarder section even though a different speed is being selected in a first or previous retarder section for a closely following car cut.

We shall describe a preferred form of apparatus embodying our invention and shall then point out the novel features thereof in claims.

In the accompanying drawings FIGS. 1a, 1b and 1c when placed side by side in the order named with FIG. 1a at the left, are diagrammatic views showing one form of apparatus embodying our invention.

Referring to the drawings, the reference characters 1a and 1b designate the track rails of a stretch of track down which cars move under gravity in the direction indicated by the arrow placed on the track from a hump to classification tracks, not shown. This stretch of track is provided with a car retarder which comprises two sections RE1 and RE2 placed end to end to be traversed by cars in that order. It is understood that the retarder may comprise a single section or more than two sections. Each section RE1 and RE2 is independent of the other to the extent that each is equipped with independent brake actuating motor means.

These retarder sections are illustrated by dash and dot rectangles since they may be any one of several constructions known to the art and the specific construction of the retarder is not a part of our present invention. As an aid in the understanding of our invention the construction for the retarder sections RE1 and RE2 will be taken as being alike and each similar to the widely used electropneumatic type disclosed in Letters Patent of the United States No. 1,927,201 granted September 19, 1933 to Herbert L. Bone for Railway Brake Apparatus. In this type of retarder braking bars mounted parallel with the track rails are biased by spring means to an open or released position where they are free from the wheels of a car passing through the retarder and are moved to a closed or braking position where they engage the sides of the car wheels by a plurality of separately operated pneumatic units. The length of a retarder section is determined by the number of units used and can be varied as the situation demands. Pressure is supplied to and exhausted from these units by a control valve which is governed by magnet valves.

In the drawings only the portions of the retarder mechanisms sufficient for a full understanding of the invention are shown for the sake of simplicity, reference being made to the aforementioned Herbert L. Bone Patent No. 1,927,201 for a complete description of the retarder mechanism. Referring to FIG. 1c and the retarder section RE1, a cylinder 10 is that of one of the independent operating units, each operating unit having a similar cylinder. The cylinder 10 contains a piston 11 attached to a piston rod 12, the outer end of which is adaptable of being connected to the braking bars by a linkage not shown. When piston 11 occupies its upper position as viewed in the drawing, the braking bars are spring biased to the non-braking or open position. When fluid pressure is admitted to the cylinder 10 above piston 11, the piston is forced downward and the braking bars are moved to their braking or closed position, the braking force exerted by the bars being determined by the pressure of the actuating fluid which is ordinarily compressed air with a maximum pressure of the order of 110 to 115 pounds per square inch.

The supply of fluid pressure to the cylinder 10 is controlled by a control valve PV which is governed by two magnet valves R and X. As here illustrated, when no car is passing through the retarder RE1, it is held closed under pressure from the source. This normal condition is effected by magnet valve R being energized and magnet valve X being deenergized. With the magnet R energized, a valve 13 is forced downward to a closed position. Also a valve 14 is forced downward to an open position. With valve 14 open pressure from a source, not shown, is admitted through a port 8 to the chamber above a piston 15 of pneumatic control valve PV forcing piston 15 downward against the force of spring 22 to open a control valve 21. With valve 21 open pressure is admitted from the source to pipe 24 leading to cylinder 10 with the result pressure from the source is applied to cylinder 10 and to all the cylinders of the other operating units of the retarder. Also with magnet X deenergized, a valve 18 is moved upward to an open position and a valve 19 to a closed position. With valve 18 open, the chamber above a piston 7 of the control valve is exhausted to atmosphere and a valve 16 is closed by a bias spring 23 and the exhaust port of the pipe 24 is blanked.

When magnet X is energized and magnet R is deenergized, the car-retarder is operated to its open position. With magnet X energized, the valves 18 and 19 are forced downward to close valve 18 and open valve 19. Under this condition pressure from the source is admitted through port 8 to the chamber above piston 7 and control valve 16 is opened to exhaust the cylinder 10 to atmosphere. With magnet R deenergized, its valve 13 is open and its valve 14 seated so that the chamber above piston 15 is exhausted to atmosphere with the result control valve 21 is closed and the supply of cylinder 10 is closed.

The magnets R and X are controlled in part by pressure responsive devices 1P, 2P and 3P, each of which comprises a Bourdon tube connected by a pipe 9 to pipe 24. Each Bourdon tube actuates a contact member between a first and a second position. For example, the tube 1P actuates a contact member 25 between a first position where it engages a stationary contact 26 and a second position where it engages a stationary contact 27. Similarly, the tube 2P actuates a contact member 28 between a first position where it engages a contact 29 and a second position where it engages a contact 30, and the tube 3P actuates a contact member 31 between a first position where it engages a contact 32 and a second position where it engages a contact 33.

These pressure regulating tubes are so constructed and adjusted that they operate successively as pressure in the cylinder 10 increases. For example, for all pressure below 25 pounds per square inch the first position contact of each pressure tube is closed. If the pressure exceeds 25 pounds per square inch, the contact 25–26 of tube 1P opens and if the pressure exceeds 35 pounds per square inch the contact 25–27 of tube 1P is closed. Similarly, the first position contact 28–29 of tube 2P opens when pressure exceeds 50 pounds per square inch and the second contact 28–30 of tube 2P is closed when the pressure exceeds 60 pounds per square inch. Also, the first position contact 31–32 of tube 3P opens when pressure exceeds 75 pounds and the second position contact 31–33 is closed when the pressure exceeds 85 pounds.

It is to be seen that when positive energy is applied to a terminal XP of the retarder RE1, the magnet X is energized and magnet R is deenergized and the retarder is actuated to the non-braking position. When positive energy is removed from terminal XP and applied to a terminal 1PP, magnet X is deenergized and magnet R is energized through contact 25–26 of tube 1P. Fluid at 100 pound pressure is admitted to cylinder 10 and the cylinders of the other operating units of the retarder. When the pressure builds up to and exceeds 25 pounds, the contact 25–26 opens and the magnet R is deenergized, with the pressure of 25 pounds retained in cylinder 10. If the pressure in cylinder 10 exceeds 35 pounds, then contact 25–27 of the tube 1P is closed so that the magnet X is energized by positive energy on terminal 1PP through a half wave rectifier element RE and the control valve PV is actuated to exhaust the pressure in cylinder 10 until it is reduced and the contact 25–27 again opens and magnet X is deenergized. On the other hand, if the pressure in cylinder 10 falls below 25 pounds then the contact 25–26 is reclosed and magnet R is reenergized to thereby open valve 21 and reapply fluid from the source to the cylinder to build up the pressure.

In a similar manner, when positive energy is applied to terminal 2PP of the retarder, the magnet R is energized through contact 28–29 of tube 2P and magnet X is controlled through contact 28–30 and the rectifier element RE and thereby pressure in cylinder 10 is maintained between the pressures of 50 and 60 pounds. Likewise when positive energy is applied to terminal 3PP the magnets R and X are controlled through contacts 31–32 and 31–33 of tube 3P to control the pressure in the cylinder 10 between 75 and 85 pounds. Furthermore, when positive energy is applied to terminal 4PP of the retarder then magnet R is energized directly and the full 100 pounds pressure of the source is supplied to cylinder 10. As stated above the retarder is shown as being normally closed but obviously it can be normally open if desired.

The structure and control of retarder section RE2 is similar to that just described for retarder section RE1. It follows that there are provided five different braking conditions that can be set up for each retarder section. It is to be understood, that our invention is not limited to this control arrangement and that more or less number of braking conditions can be used, and that the pressures cited are merely examples and in practice can vary therefrom.

In manual control of car retarders, positive energy is selectively applied to the retarder control terminals through different positions of a manually operable lever having a position for each braking condition. Where a retarder is to be controlled automatically by apparatus embodying our present invention such manual control is disconnected and positive energy is selectively applied to the control terminals of retarder sections RE1 and RE2 through circuits governed by our apparatus to be described hereinafter. In the drawing the manual control means is not shown for the sake of simplicity.

Figure 1A:
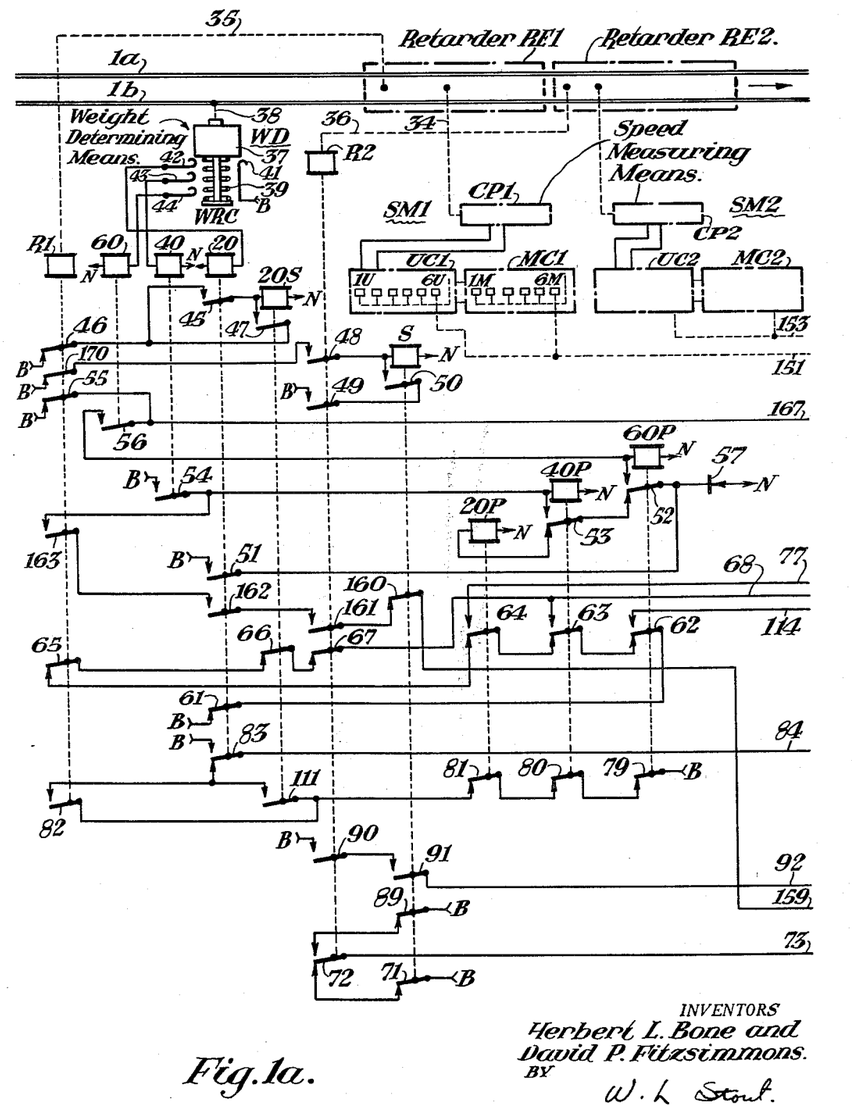

To determine the speed of a car passing through the retarder sections RE1 and RE2, each section is provided with a speed measuring means which are designated in FIG. 1a by the reference characters SM1 and SM2, respectively. These speed measuring means are preferably alike and may take different forms. Preferably we provide speed measuring means of the construction basically disclosed in Letters Patent of the United States No. 2,320,-

802, granted June 1, 1943, to C. S. Snavely for Railway Braking Apparatus, an improvement of which apparatus is disclosed in a copending United States application Serial No. 283,931, filed April 23, 1952, by D. P. Fitzsimmons for Railway Car Speed Determining and Control Apparatus, now Patent No. 2,751,492, granted June 19, 1956, this Fitzsimmons application and the present application being of common ownership.

It is sufficient for a full understanding of our invention to describe this speed measuring means only briefly, reference being made to the above mentioned D. P. Fitzsimmons patent for a complete description of such railway car speed measuring means.

Since the two speed measuring means are alike the following description refers specifically to the means SM1 for retarder section RE1. As explained in the aforementioned Fitzsimmons patent, the track rails of the railway track within retarder RE1 are formed with a series of insulated track sections. These track sections are relatively short and are of the same length, a length of the order of 3 feet and 1½ inches being suitable for the form of retarder here contemplated. Also this length is such that only one pair of car wheels and axle can occupy a track section at a time. Each track section is provided with a normally energized track circuit having a track relay. Each track relay is controlled by a holding or stick circuit, a shunting circuit and a pickup or reset circuit. The holding circuit for each track relay includes a front contact of the relay and a front contact of all the following track relays except the relay for the leaving track section. The shunting circuit for each track relay includes the track rails of the corresponding track section so that the relay is shunted and released in response to a pair of car wheels occupying the track section. The reset circuit is such that the relays are picked up in cascade and a relay can be picked up only when all the relays in the rear are picked up. This control of the track relays assures that the track relays are successively released in response to the leading pair of car wheels passing through the track sections and that the control is passed to the next pair of wheels in the rear when the leading pair of wheels leaves the last track section. This control is then successively passed to the other pairs of wheels until the last pair of wheels of the car leaves the retarder.

These track relays for the track sections of retarder RE1 are used through a control relay means, not shown, but conventionally indicated in FIG. 1a by a dotted line 34, to control a time measuring means which comprises a cycle repeater device CP1, a unit cycle counting relay chain UC1 and a multiple cycle counting relay chain MC1. This type of cycle repeater device CP1 is supplied with alternating current from any convenient source such as the usual 60 cycle commercial power line and includes quick acting relays operable to alternately close a pair of contacts in step with the cycles of the alternating current. The unit cycle counting relay chain UC1 includes a chain of six relays 1U to 6U, inclusive. This relay chain is connected to the cycle repeater CP1 and the relays operated one after the other by the current pulses created by the operation of the contacts of the cycle repeater. Thus, the action of the chain is advanced by one relay each cycle of the alternating current. The relays of this chain are interconnected so that when the count of six is exceeded, the relay chain doubles back and continues to count over and over again. The multiple cycle counting relay chain MC1 includes a chain of six counting relays 1M to 6M, inclusive. This relay chain is connected to the unit cycle chain UC1 in such a manner as to progressively pick up the relays one each time the unit chain completes a round trip operation. Thus, the six relays of the multiple counting relay chain MC1 are all picked up in response to six round trip operations of the unit cycle chain UC1. That is, the relays of the counting chain MC1 are all picked up in response to thirty-six cycles of alternating current. Hence, the extreme position of the time measuring means is reached in 7 round trip operations of the unit cycle counting chain UC1 and a count of 42 cycles for the alternating current is made, the total time measured being about 0.7 second or 700 milliseconds when 60 cycle alternating current is used. It is clear that the particular relays of the two chains UC1 and MC1 which are picked up at any instance are a measure of the time consumed after initiation of the operation. For example, if the relays 6U and 6M are picked up, while a pair of car wheels are moving through the 3 feet 1½ inches of a track section of the retarder RE1, the average speed of the car is approximately 3.1 miles per hour. Again, if only the one relay 1M of the chain MC1 is picked up while a pair of car wheels moves through a track section, the average speed of the car is approximately 21.3 miles per hour. Hence, the speed measuring means SM1 is capable of measuring a range of speeds from 3 to 25 miles per hour for each track section associated with the retarder section RE1.

The speed measuring means SM2 is provided with a time measuring means which comprises a cycle repeater CP2 and two counting relay chains UC2 and MC2. This time measuring means for the speed measuring means SM2 operates substantially in the same manner as that just described in connection with the speed measuring means SM1.

The apparatus embodying our invention includes two occupancy relays R1 and R2 which are associated with the retarders RE1 and RE2, respectively. Each of the relays R1 and R2 is controlled by the previously mentioned track circuits of the respective retarder, the arrangement being such that relay R1, for example, is deenergized and released when the track circuits of retarder section RE1 are unoccupied and the relay is energized and picked up as long as any pair of wheels of a car occupy any one of the track circuits associated with the retarder RE1. Similarly, the relay R2 is deenergized and released when the retarder RE2 is unoccupied and is energized and picked up as long as any pair of wheels of a car occupy the retarder RE2. The connections for the relays R1 and R2 are indicated conventionally by dotted lines 35 and 36, respectively, since the particular control connection can be of any suitable arrangement to detect the occupancy of the corresponding retarder section and the specific connection is not a part of this invention.

It is to be pointed out that a suitable source of power is provided which is preferably in the form of a battery of proper voltage and having positive and negative terminals which are designated by the usual conventional reference characters B and N.

The apparatus includes a car weight determining means designated as a whole by the reference character WD and which comprises a weight responsive device, a group of register relays and groups of weight information storage relays. The weight responsive device may be scales or similar means and as here provided it includes a circuit contactor WRC and relays 20, 40 and 60. The contactor WRC is a circuit controller having an operating element mounted in the trackway and operable to selectively close contacts in accordance with the car weight. As illustrated in the drawing this contactor WRC includes a movable contact element 37 which is operably connected to rail 1b by a suitable linkage illustrated by dotted line 38. The linkage 38 is connected to the rail 1b at a point a selected distance in the approach to the entrance of the retarder RE1. Generally, the distance between this connection and the retarder RE1 may be of the order of one-half car length or, say, of the order of 25 feet. The point of connection of this linkage is not critical but is at a distance in the approach of the retarder sufficient to assure ample time for setting the retarder at a desired initial braking force subsequent to a pair of car wheels moving over the weighing device, and before they enter the retarder. The contact element 37 is raised by a spring 39 to an upward position and the linkage 38 is such that the element 37 is depressed according to the deflection of the rail. The parts are so proportioned that the downward movement of member 37 when a car wheel rolls past the point of connection to the rail is proportional to the car weight. The contact member 37 cooperates with four stationary contact springs 41, 42, 43 and 44, the arrangement being such that contact member 37 when depressed constantly engages contact spring 41 and selectively engages the contacts 42, 43 and 44 depending upon the extent of its downward movement. By properly proportioning the parts the contacts may be made to close for any desired car weight. For illustration we shall assume that for a car weighing less than 40 tons the contact 41–42 is closed, when the car weight is between 40 and 60 tons the contact 41–43 is closed, and when the car weight is over 60 tons the contact 41–44 is closed. That is, the contacts distinguish between three different groups of car weight, namely, (1) light less than 40 tons, (2) medium between 40 and 60 tons, and (3) heavy over 60 tons. In other words, this weight responsive device distinguishes between light, medium and heavy car weights.

This contactor WRC controls the group of measuring relays 20, 40 and 60 by simple circuits easily traced. Specifically, relay 20 is energized and picked up for all cars, the relay 40 is energized and picked up for all cars in the medium and heavy weight groups and relay 60 is picked up for only cars in the heavy weight group.

It is to be understood that our invention is not limited to the use of a contactor of the type here illustrated for determining the weight of a car and other suitable weight responsive means can be used. Also, other car weight groups can be provided.

It will be apparent from the foregoing description that for a heavy weight car all three relays 20, 40 and 60 are picked up sequentially, for medium weight cars the relays 20 and 40 are picked up sequentially and for a light weight car the relay 20 only is picked up. There is no requirement as to the length of time these relays 20, 40 and 60 should be picked up but the weighing device should be operated long enough to have picked up these weight measuring relays and these relays in turn should be picked up long enough to have picked up associated repeater registering relays 20P, 40P and 60P to be referred to shortly.

The relays 20, 40 and 60 also control a stick relay 20S and are associated with another relay S. The relay 20S retains the weight information from the time the first wheel of a car passes over the trackway element of the weight determining means until the car enters first retarder section RE1. The relay 20S is provided with a pickup circuit which includes back contact 46 of relay R1 and front contact 45 of relay 20 and is provided with a stick circuit including back contact 46 of relay R1 and its own front contact 47.

The relay S is a stick relay which as shown in FIG. 1a is used to differentiate between multiple car cuts and closely spaced single car cuts. The relay S is energized over a pickup circuit including terminal B, back contact 170 of relay R1, front contact 48 of relay R2, winding of relay S and terminal N; and is provided with a stick circuit that is closed at front contact 49 of relay R2, and its own front contact 50. Thus, relay S becomes energized when a leading car leaves retarder section RE1 and a closely following second car is weighed while the leading car is still in the second retarder section RE2, but does not become energized for a multiple car cut in which the leading car enters retarder RE2 while later cars in the cut are being weighed.

The register relays 20P, 40P and 60P are controlled by the weight measuring relays 20, 40 and 60 and by the two retarder occupancy relays R1 and R2 to register light, medium and heavy weight cars. The register relay 20P is energized by a circuit which extends from terminal B of the power source over front contact 51 of relay 20, back contact 52 of relay 60P, back contact 53 of relay 40P, and the winding of relay 20P to terminal N. Thus, the register relay 20P is picked up for light weight cars. If the car is of medium weight and relay 40 picks up, register relay 40P is energized by a simple circuit including front contact 54 of relay 40. The register relay 40P, once picked up to close its front contact 53, is retained energized by a stick circuit, including front contact 51 of relay 20 and back contact 52 of relay 60P. It is to be seen therefore that register relay 40P is energized in response to a medium weight car and is retained energized until this car passes beyond the weight measuring point and relay 20 is released. The register relay 40P is further provided with an auxiliary pickup circuit to be described hereinafter.

When a heavy weight car passes over the weight measuring device and relay 60 picks up, a circuit is completed by which current flows from terminal B over back contact 55 of relay R1, front contact 56 of relay 60, and winding of relay 60P to terminal N, and register relay 60P is energized and picks up. The register relay 60P is then retained energized over a stick circuit that includes its own front contact 52 and front contact 51 of relay 20. Consequently, the registering relay 60P is picked up in response to a heavy weight car and is retained energized until the heavy weight car moves beyond the weight measuring point and relay 20 is released. A half-wave rectifier 57 is associated with the circuits for the register relays in a manner to provide these relays with a short slow-release action. Furthermore, the register relay 60P is provided with an alternate pickup circuit to be described hereinafter.

The car weight registered at relays 20P, 40P and 60P is stored in one or the other of two groups of relays. As shown, each group includes three relays, there being a relay for each car weight group. There are two groups of three relays each for each retarder section. Relays 1S1, 2S1 and 3S1 form one group and relays 1F1, 2F1 and 3F1 form another relay group associated with retarder section RE1. In like manner, relays 1S2, 2S2 and 3S2 and relays 1F2, 2F2 and 3F2 are two groups for the second retarder section RE2. Furthermore, the storing of car weight informaiton in the relay group 1S1–2S1–3S1 or in the group 1F1–2F1–3F1 associated with retarder section RE1 is selected according as relay SF of a temperature selective means is not or is energized. Similarly, the storing of car weight information in the relay group 1S2–2S2–3S2 or in the relay group 1F2–2F2–3F2 for the second retarder section RE2 is selected according as the temperature selector relay SF is not or is energized.

The temperature selector relay SF is controlled to one of two positions by switch TS, the relay being deenergized when the switch TS is set at a first or solid line position and being energized over a simple circuit when the switch is set in a second or dotted line position. The switch TS is manually operated to the first position when the temperature is high and is set at the second position when the temperature is low. The switch TS may, of course, be operated automatically through a suitable temperature responsive device. Obviously this relay SF can be made responsive to other car rolling conditions.

The relay circuits by which the car weight information is stored in these relay groups will now be described. It is to be noted that under standby conditions, that is, when no cars are being switched, the relay 2S1 of the first group and the relay 2S2 of the second group are energized and picked up. This is done in order that the retarder sections RE1 and RE2 are set for medium car weight braking under standby conditions.

Specifically, relay 2S1 is supplied with current by a circuit traced from terminal B over back contacts 61, 62, 63, 64, 65, 66 and 67 of relays 20, 60P, 40P, 20P, R1, 20S and R2, respectively, wire 68, winding of relay 2S1, rectifier element 69 and back contact 70 of relay SF to terminal N. Also, at this time current is supplied to relay 2S2 by a circuit traced from terminal B over back contacts 71 and 72 of relays S and R2, respectively, wire 73, back contacts 74 and 75 of relays SF and 1S1, respectively, front contact 76 of relay 2S1 and winding of relay 2S2 to terminal N. It is clear that when a car moves over the weight determining means WD and relay 20 is energized to close front contact 83, the relay 2S1 is retained energized by a first stick circuit including front contact 83, wire 84, back contact 85 of relay 1S1, front contact 108 and winding of relay 2S1. Thus, while the first car is being weighed after a standby period, storage relays 2S1 and 2S2 are retained energized and no change takes place in the setting of the retarder sections.

Assuming a light weight car moves over the weight determining means WD under high temperature switching, this weight information is stored at relay 3S1 of the first storage relay group and then at relay 3S2 of the second group in the following manner. The pickup of relay 20 closes front contact 45 to energize relay 20S, which is held energized by its stick circuit. When register relay 20P is picked up in response to the light weight car, and before it releases after relay 20 is released, the normally energized storage relay 2S1 is released since its stick circuit network is open, first at front contact 83 of relay 20, and then, even though front contact 111 of relay 20S is now closed, at back contact 81 of relay 20P. With relay 2S1 released to open front contact 76 the normally energized storage relay 2S2 is deenergized. Before the release of register relay 20P current is supplied to relay 3S1 by a pickup circuit extending from terminal B over back contacts 61, 62 and 63 of relays 20, 60P and 40P, respectively, front contact 64 of relay 20P, wire 77, winding of relay 3S1, rectifier element 78 and back contact 70 of relay SF to terminal N. Also at this time relay 20S is picked up and between the weighing of the different pairs of wheels of the car, relay 3S1 receives current over a stick circuit network, one path of which extends from terminal B over back contacts 79, 80 and 81 of relays 60P, 40P and 20P, respectively, front contact 111 of relay 20S, back contact 83 of relay 20, wire 84, back contacts 85 and 86 of relays 1S1 and 2S1, front contact 87 and winding of relay 3S1, rectifier 78 and back contact 70 of relay SF to terminal N. During the weighing of each car wheel this stick circuit is completed to terminal B over front contact 83 of relay 20. When the car enters retarder RE1 this stick circuit is completed over front contact 82 of relay R1, which replaces now open front contact 111 of relay 20S. Thus, this light weight car information is stored at relay 3S1 until the car fully passes out of retarder RE1 and relay R1 is released to open front contact 82.

With storage relay 3S1 picked up the light weight car information is stored at relay 3S2 for the control of retarder RE2. Current is first supplied to relay 3S2 by a pickup circuit extending from terminal B over back contact 71 of relay S, back contact 72 of relay R2, wire 73, back contacts 74, 75 and 76 of relays SF, 1S1 and 2S1, respectively, front contact 88 of relay 3S1 and winding of relay 3S2 to terminal N. Then, as the first pair of the car wheels enters the second retarder section RE2 and relay R2 is picked up, the storage relay 3S2 is retained energized by the circuit extending from terminal B over back contact 89 of relay S, front contact 72 of relay R2 and thence as previously traced for the initial pickup circuit. For reasons to appear later for closely following single car cuts, the storage relay 3S2 is provided with a stick circuit that includes terminal B, front contacts 90 and 91 of relays R2 and S, respectively, wire 92, back contact 93 of relay 2S2, front contact 94 and winding of relay 3S2 and terminal N. Thus, this light car weight information is retained by storage relay 3S2 of the second group until the car passes fully out of the retarder RE2 and relay R2 is released to open its front contacts 72 and 90.

In the event switching is being done at a low temperature condition and relay SF is picked up, this light weight car information is stored in relays 3F1 and 3F2 of the third and fourth relay groups in place of being stored in the relays 3S1 and 3S2 of the first and second relay groups. With relay SF picked up closing front contacts 70 and 74, register relay 20P picked up in response to the weighing of the car and the relay 20 reset, current flows from terminal B over back contacts 61, 62 and 63 of relays 20, 60P and 40P, respectively, front contact 64 of relay 20P, wires 77 and 168, winding of relay 3F1, rectifier element 95, wire 96 and front contact 70 of relay SF to terminal N. Then while this light weight car approaches and enters the retarder RE1 and relay R1 is picked up closing front contact 82, the relay 3F1 is retained picked up by the stick circuit network that is the same as that traced for relay 3S1 up to wire 84 and thence over wire 97, back contacts 98 and 99 of relays 1F1 and 2F1, respectively, front contact 100 and winding of relay 3F1, rectifier 95, wire 96, and front contact 70 of relay SF to terminal N. Consequently, the storage of a light weight car information by relay 3F1 is retained until the car passes fully out of the retarder RE1. The light weight car information is further stored by the energizing of relay 3F2 subsequent to the energizing of the relay 3F1, the relay 3F2 being supplied with current by a pickup circuit extending from terminal B over back contact 71 of relay S, back contact 72 of relay R2, wire 73, front contact 74 of relay SF, wire 101, back contacts 102 and 103 of relays 1F1 and 2F1, respectively, front contact 104 of relay 3F1 and winding of relay 3F2 to terminal N. The storage relay 3F2 is further energized by the alternate pickup circuit completed at back contact 89 of relay S and front contact 72 of relay R2. Furthermore, when there is a closely following car relay 3F2 is retained energized by a stick circuit which is the same as that traced for relay 3S2 up to wire 92 and thence over wire 105, back contact 106 of relay 2F2, front contact 107 and winding of relay 3F2 to terminal N. Thus, under low temperature switching, the light weight car information is retained stored by relay 3F2 until the car fully passes out of retarder RE2 and relay R2 is released to open its front contacts.

Assuming next, that a medium weight car is weighed. This weight information is stored at relays 2S1 and 2S2 of the first and second relay groups under high temperature switching and at relays 2F1 and 2F2 of the third and fourth groups under low temperature switching. Under high temperature the picking up of register relay 40P prepares a pickup circuit for relay 2S1, which when relay 20 is reset extends from terminal B over back contacts 61 and 62 of relays 20 and 60P, respectively, front contact 63 of relay 40P, wire 68, winding of relay 2S1, rectifier element 69, and back contact 70 of relay SF to terminal N.

This storage relay 2S1 is further supplied with current over the stick circuit network. While the car is passing from the weighing device to the retarder and relay 20S is picked up and each time the weighing device is reset between car wheels, current flows from terminal B, over back contacts 79, 80 and 81 of relays 60P, 40P and 20P, front contact 111 of relay 20S, back contact 83 of relay 20, wire 84, back contact 85 of relay 1S1, front contact 108 and winding of relay 2S1, rectifier 69, and back contact 70 of relay SF to terminal N. During weighing of a car the stick circuit is completed at front contact 83 of relay 20. After the leading pair of wheels of this medium weight car has passed into the retarder RE1, the stick circuit for relay 2S1 is completed at front contact 82 of relay R1. It follows that the medium weight car information is retained stored by relay 2S1 until the car vacates retarder RE1, and relay R1 is released to open front contact 82.

The medium weight car information is stored at relay 2S2 for control of retarder RE2. Relay 2S2 is first energized by a pickup circuit closed from terminal B over back contacts 71 and 72 of relays S and R2, respectively, wire 73, back contacts 74 and 75 of relays SF and 1S1, respectively, front contact 76 of relay 2S1 and winding of relay 2S2 to terminal N. This circuit is also completed over back contact 89 of relay S and front contact 72 of relay R2 when this latter relay picks up. A stick circuit is completed for energizing relay 2S2 when the car enters retarder RE2 if there is a closely following car, it being noted that relay S at such time is picked up and held energized by its stick circuit. This stick circuit for storage relay 2S2 includes terminal B, front contacts 90 and 91 of relays R2 and S, respectively, wire 92, front contact 108 and winding of relay 2S2 and terminal N.

The storage of this medium weight car information is effected at relays 2F1 and 2F2 under low temperature switching by circuits which are extensions of the circuits for relays 2S1 and 2S2. When relay 40P is picked up to close front contact 63 and positive energy is applied to wire 68, current flows over wire 109, winding of relay 2F1, rectifier element 110, wire 96 and front contact 70 of relay SF to terminal N and storage relay 2F1 is picked up. The stick circuit paths by which positive energy is applied to wire 84 now cause current to flow from wire 84 over wire 97, back contact 98 of relay 1F1; front contact 112 and winding of relay 2F1, rectifier 110, wire 96 and front contact 70 of relay SF to terminal N. Hence, storage relay 2F1 is retained energized until this medium weight car leaves retarder RE1 when switching is being done under low temperature conditions.

When relay SF is picked up closing front contact 74 the previously described pickup circuit for storage relay 2S2 is made to extend from wire 73 over wire 101, back contact 102 of relay 1F1, front contact 103 of relay 2F1 and winding of relay 2F2 to terminal N, and storage relay 2F2 is picked up to storage the medium weight car information. The stick circuit previously described for relay 2S2 now extends from wire 92 over wire 105, front contact 113 and winding of relay 2F2 to terminal N, and relay 2F2 is retained energized to store the medium weight car information until the cars passes out of retarder RE2 and relay R2 is released opening its front contacts 72 and 90.

In a similar manner information of the weighing of a heavy weight car is stored at relays 1S1 and 1S2 under high temperature switching and at relays 1F1 and 1F2 under low temperature switching. When relay 60P is picked up in response to a heavy car under high temperature switching and after the weighing device is reset, a pickup circuit is formed for relay 1S1 by which current flows from terminal B over back contact 61 of relay 20, front contact 62 of relay 60P, wire 114, winding of relay 1S1, rectifier element 115, and back contact 70 of relay SF to terminal N. Subsequent to the leading pair of wheels of this heavy car moving over the weighing device and then occupying retarder RE1, the relay 1S1 is energized by the stick circuit network which is the same as that traced for relay 2S1 up to wire 84 and thence over front contact 116 and winding of relay 1S1, rectifier 115 and back contact 70 of relay SF to terminal N.

With storage relay 1S1 picked up, the storage relay 1S2 is energized by a pickup circuit which is the same as traced for relays 3S2 and 2S2 up to back contact 74 of relay SF and then over front contact 75 of relay 1S1 and winding of relay 1S2 to terminal N. A stick circuit for relay 1S2 includes terminal B, front contacts 90 and 91 of relays R2 and S respectively, wire 92, back contact 93 of relay 2S2, front contact 117 and winding of relay 1S2 and terminal N. Hence, the heavy weight car information is stored at relay 1S2 until the car fully passes out of retarder RE2.

To store the heavy weight car information at relays 1F1 and 1F1 low temperature switching the pickup and stick circuits provided for relays 1S1 and 1S2 are extended over front contacts of relay SF. The pickup circuit for relay 1F1 extends from wire 114 of the circuit for relay 1S1, over wire 118, winding of relay 1F1, rectifier element 119, wire 96 and front contact 70 of relay SF to terminal N. The stick circuit for relay 1F1 extends from wire 84 of the circuit for relay 1S1 over wire 97, front contact 120 and winding of relay 1F1, rectifier 119, wire 96 and front contact 70 of relay SF to terminal N. With relay 1F1 picked up to close front contact 102, the previously traced pickup circuit for relay 2F2 is extended from wire 101 over front contact 102 of relay 1F1 through winding of relay 1F2 to terminal N and relay 1F2 is energized. The previously traced stick circuit for relay 1S2 is extended from wire 92 over wire 105, back contact 106 of relay 2F2, front contact 121 and winding of relay 1F2 to terminal N. It is to be seen therefore that heavy weight car information is retained at relay 1F1 until the car vacates retarder RE1, and is retained at relay 1F2 until the car vacates retarder RE2 under low temperature switching.

We have explained previously how the correct speeds for cars to leave the retarders are different according to weight and rolling conditions and the leaving speed selected should be different from the retarder sections RE1 and RE2. We have assumed for illustration leaving speeds of 12, 9 and 7 miles per hour for light, medium and heavy cars, respectively, under high temperature switching; and leaving speeds of 15, 12 and 10 miles per hour for light, medium and heavy cars under low temperature switching for retarder section RE2 and somewhat different leaving speeds for retarder section RE1. Again, it has been explained hereinbefore that each retarder RE1 and RE2 is constructed with five different pressure conditions to effect corresponding different braking efforts to obtain desired leaving speed, and which pressure conditions are selectively effected according as to which retarder control terminal positive energy is applied.

Furthermore, to obtain correct leaving speeds the braking effort of the retarder is controlled automatically according to the speed of the car passing through the retarder, the braking effort being decreased and the car allowed to speed up when the measured speed falls below or close the desired leaving speed, and the braking effort increased when the measured car speed becomes high and above the desired leaving speed. To this end the apparatus includes braking force selective means or when electropneumatic type retarders are used pressure selective means. Since we have disclosed retarders of the electropneumatic type the braking force selective means is a speed pressure selective means which may be similar to that disclosed and claimed in a copending United States patent application Serial No. 283,932, filed April 23, 1952, by E. J. Agnew for Car Retarder Speed Pressure Selective Control Apparatus, now Patent No. 2,727,138, granted December 13, 1955, this Agnew patent and the current application being of common ownership. Reference is made to this E. J. Agnew patent for a full description of the braking force or pressure selective means here used, and it is sufficient for our present application to disclose the braking force selective means conventionally and describe it only as necessary to set forth its relationship in the combination with the other devices.

Figure 1B:
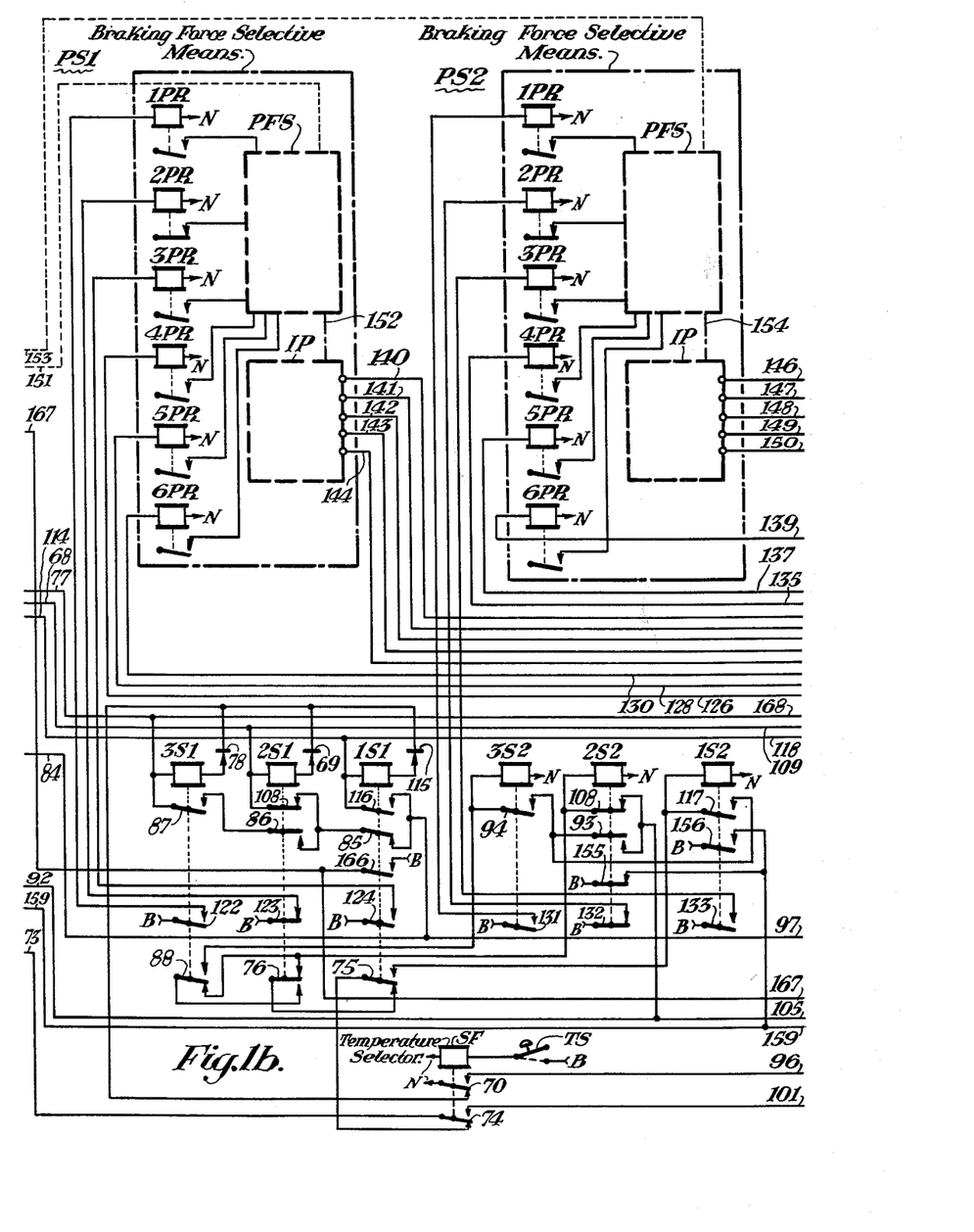
Figure 1C:
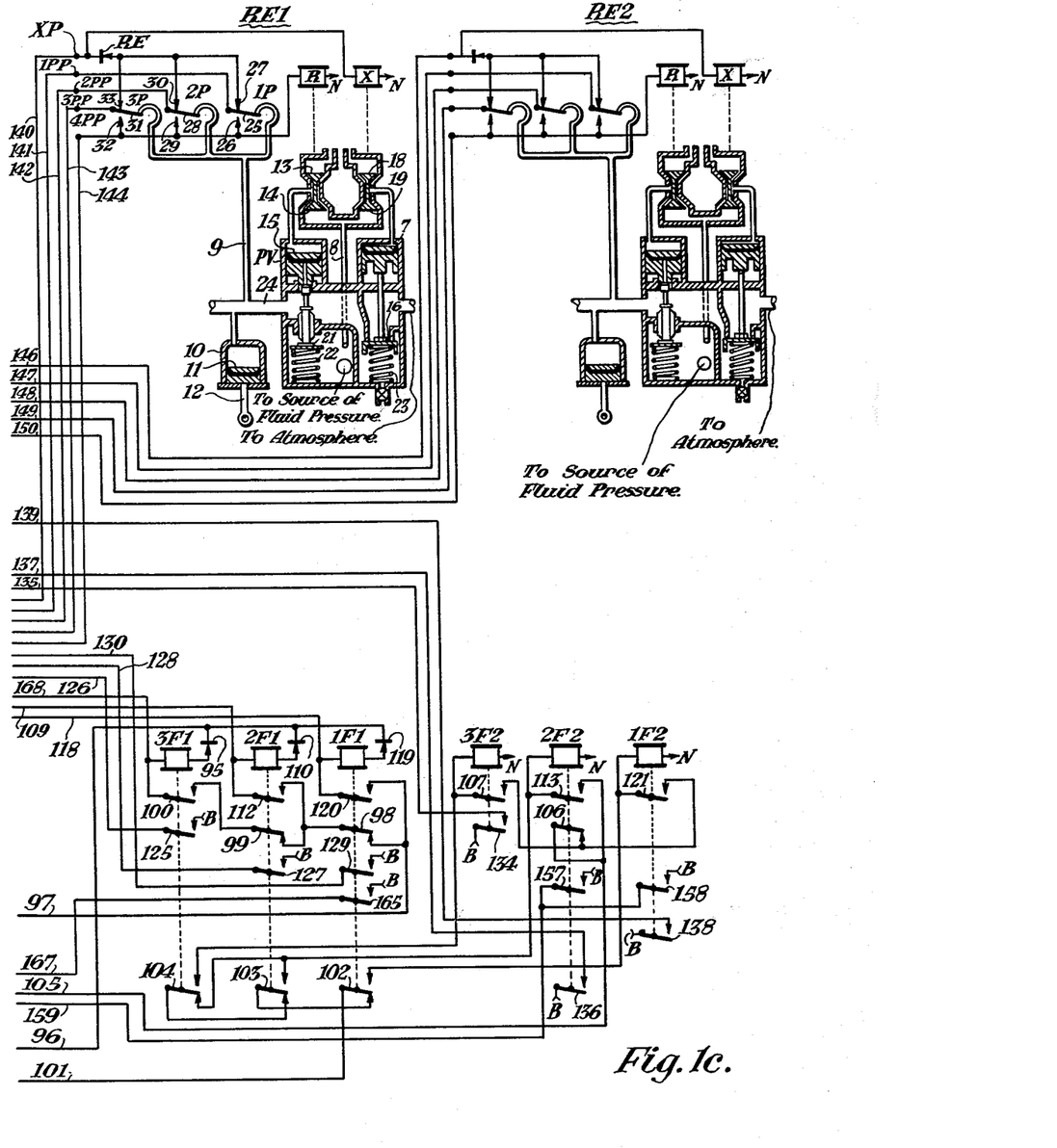

In FIG. 1b, two braking force or pressure selective means PS1 and PS2 are provided for retarder sections RE1 and RE2, respectively. These selective means are shown by dash-dot rectangles and are preferably alike and each includes a series of leaving speed selector relays, a first or initial and partial pressure selective circuit network or panel, and a second or partial pressure release speed and full release speed circuit network or panel. As an aid in understanding the braking force selective means the series of relays and circuit networks are identified in FIG. 1b by reference characters which correspond to the reference characters used for the corresponding parts in the above mentioned Agnew patent. Looking at the selective means PS1, it includes leaving speed selector relays 1PR, 2PR, 3PR, 4PR, 5PR and 6PR, an initial pressure and partial pressure control panel and network IP, and a second or partial pressure release speed and full release speed control panel and network PFS.

The six selector relays 1PR to 6PR are assigned to leaving speeds individual to the different car weight groups. Taking the leaving speed used here for illustration for retarder section RE2 and further assuming the leaving speeds for retarder section RE1 are of the order of 2 miles per hour higher than the leaving speeds for retarder section RE2, the relays 1PR, 2PR and 3PR are assigned to leaving speeds of 14, 11 and 9 miles per hour, respectively, for light, medium and heavy cars under high temperature switching. Under these assumptions the relays 4PR, 5PR and 6PR are assigned leaving speeds of 17, 14 and 12 miles per hour, respectively, for light, medium and heavy cars under low temperature switching.

Since light, medium and heavy weight car informations for control of retarder RE1 are stored by relays 3S1, 2S1 and 1S1 under high temperatures, and by relays 3F1, 2F1 and 1F1 under low temperatures, the relays 1PR, 2PR and 3PR of selective means PS1 are controlled by relays 3S1, 2S1 and 1S1, respectively, and relays 4PR, 5PR and 6PR of means PS1 are controlled by relays 3F1, 2F1 and 1F1, respectively. These control circuits are easily traced and it is apparent from an inspection of FIG. 1b that the circuits for relays 1PR, 2PR and 3PR are completed at front contacts 122, 123 and 124, of relays 3S1, 2S1 and 1S1, respectively. Likewise the circuits for relays 4PR, 5PR and 6PR of means PS1 are completed over front contact 125 of relay 3F1 and wire 126 for relay 4PR, front contact 127 of relay 2F1 and wire 128 for relay 5PR, and front contact 129 of relay 1F1 and wire 130 for relay 6PR.

Similarly, the leaving speed relays 1PR, 2PR and 3PR of the selective means PS2 for retarder RE2 are assigned leaving speeds 12, 9 and 7 miles per hour and relays 4PR, 5PR and 6PR of selective means PS2 are assigned leaving speeds of 15, 12 and 10 miles per hour. Thus, the relays 1PR, 2PR and 3PR of means PS2 are controlled by the weight storage relays 3S2, 2S2 and 1S2, the circuit for relay 1PR including front contact 131 of relay 3S2, the circuit for relay 2PR including front contact 132 of relay 2S2 and the circuit for relay 3PR including front contact 133 of relay 1S2. Continuing, the relays 4PR, 5PR and 6PR of means PS2 are controlled by relays 3F2, 2F2 and 1F2, the circuit for relay 4PR being completed over front contact 134 of relay 3F2 and wire 135, the circuit for relay 5PR being completed over front contact 136 of relay 2F2 and wire 137, and the circuit for relay 6PR being completed over front contact 138 of relay 1F2 and wire 139.

In providing the desired retarder leaving speed each selective means PS1 and PS2 establishes for its retarder a selected initial pressure, a given partial pressure to which the initial pressure is reduced as the speed of the car passing through the retarder comes near to the correct leaving speed and the full release of pressure at the desired leaving speed, and reapplications of pressure when the car speeds up. To this end the first and second networks IP and PFS of each of the selective means PS1 and PS2 are arranged so that the controls set up at its series of relays 1PR to 6PR and by the speed measuring means of the same retarder are made to cooperate to selectively apply positive energy to the control terminals of the corresponding retarder.

Briefly, as described in the Agnew patent, the first network IP is a control panel on which are mounted two series of repeater relay jacks, one series for initial pressure control, and another series for partial pressure control. The panel IP also is provided with a series of different groups of jacks which are electrically connected to terminals that in turn have connections to the control terminals of the corresponding retarder. In the drawings, these connections from control panel IP of selective means PS1 to retarder RE1 are completed over wires 140 to 144, inclusive.

This arrangement of panel IP of selective means PS1 is such that, by plug connectors inserted in the jacks, any one of the five different pressure conditions of retarder RE1 can be preselected as the initial pressure for any of the desired leaving speeds selected by the relays 1PR to 6PR, inclusive. Also by plug connectors inserted in the jacks of panel IP, the partial pressure to which the initial pressure is to be reduced when car speed is near the desired leaving speed can be preselected.

The network PFS of selective means PS1 also comprises a control panel on which are mounted jacks. This panel PFS is provided with two groups of repeater relay jacks, and other groups of jacks having electrical connections with the timing relay chains of the speed measuring means SM1 for the corresponding retarder RE1. Also, electrical connections are provided between the jacks of the networks PFS and IP. These electrical circuit connections of panel PFS with speed measuring means SM1 and panel IP are shown conventionally by dotted lines 151 and 152.

As fully explained in the aforementioned Agnew patent, the arrangement is such that by plug connectors at panel PFS of the braking selective means PS1, contacts of leaving speed repeater relays and contacts of the relays of the timing chains of the speed measuring means SM1 and jacks of the panel IP can be associated whereby different partial pressure release speeds and full release speeds can be selected for each of the different leaving speeds identified by the associated leaving speed repeater relay.

In other words, these networks IP and PFS of selective means PS1 provide, by plug connectors inserted in proper jacks, a large selection of settings for initial pressure, partial pressure to which the initial pressure is reduced as the car speed nears the desired leaving speed, full release at the desired leaving speed and reapplication of pressure if the car speed increases.

To put it another way, these networks IP and PFS of the selective means PS1 provide a large number of different possible retarder braking force control circuit arrangements that can be prepared by use of plug connectors inserted in jacks to set up desired leaving speeds for different car weights. The prepared circuit arrangements automatically selected and brought into use by the stored car weight informations are interpreted at the leaving speed selector relays 1PR to 6PR and by the actual speed of the car passing through the retarder as measured by the speed measuring means SM1 for retarder RE1.

The pressure selective means PS2 is similar in construction to that of means PS1 and functions in a similar manner in the control of retarder RE2, the connections from means PS2 to retarder RE2 being completed over wires 146 to 150, inclusive, and the electrical association of its network PFS with the timing relay chains of speed measuring means SM2 and network IP being indicated by dotted lines 153 and 154.

In describing the operation of this apparatus, it is to be pointed out that under standby conditions, that is, when no car is being humped, storage relays 2S1 and 2S2 are energized, and the 2PR relays of the braking force selective means PS1 and PS2 are picked up with the result each retarder RE1 and RE2 is set under pressure.

Assuming that switching is being done under high temperature conditions and a single light weight car is started down the hump, the leading pair of wheels of the car is passing over the weight contactor WRC causes relay 20 to be energized and weight register relay 20P is energized in response to closing of front contact 51 of relay 20. Relay 20S is also energized by the picking up of relay 20. When the leading pair of wheels roll beyond contactor WRS, relay 20 at once releases and the light weight car registered at relay 20P is stored at relay 3S1 by circuits previously traced. This action is repeated for each pair of wheels of the car and the storage relay 3S1 is retained energized over one or the other of its circuit paths until the car advances far enough for its leading pair of wheels to enter retarder RE1 causing relay R1 to be picked up. After this the storage relay 3S1 is energized by its stick circuit path completed through front contact 82 of relay R1. When relay 3S1 is first picked up the leaving speed selective relay 1PR of braking force selective means PS1 is energized and retarder RE1 is set for the initial braking force desired for light weight car control. The time required for the leading wheels of the car to roll from the weight contactor WRC to the retarder RE1 is sufficient to establish this control of that retarder.

As this light weight car passes through retarder RE1 the speed measuring means SM1 functions to repeatedly measure the car speed and select circuit arrangements of selective means PS1 to so control retarder RE1 as to obtain the desired leaving speed which we have assumed as being 14 miles per hour for light weight cars under high temperature conditions for retarder section RE1.

As soon as storage relay 3S1 picks up, the light weight car information is stored at relay 3S2, relay 3S2 being first picked up due to the closure of front contact 88 of relay 3S1 and then retained energized by the circuit completed at front contact 72 of relay R2 when the leading pair of wheels enter retarder RE2. With relay 3S2 energized leaving speed selector relay 1PR of braking force selective means PS2 is selected with the result the desired initial braking force is established for retarder RE2. As this light weight car passes through retarder RE2 the speed measuring means SM2 repeatedly measures the speed and selects circuit arrangements in means PS2 for retarder RE2 as required to obtain a leaving speed of 12 miles per hour.

The operation of the apparatus is similar for a medium or a heavy weight car. The information for a medium weight car is first stored at relay 2S1 which is picked up due to the closing of front contact 63 of relay 40P and then retained energized by the stick circuit paths of this group of relays until the medium weight car passes out of retarder RE1. Relay 2S1 selects leaving speed relay 2PR of the selective means PS1 and the initial and partial braking forces to effect a leaving speed of 11 miles per hour are automatically established for retarder RE1. The speed measuring means SM1 now cooperates with means PS1 to select circuits by which the pressure effected by retarder RE1 obtains this desired medium weight car leaving speed. The medium weight car information is further stored at relay 2S2 and the leaving speed relay 2PR of means PS2 is selected. The speed measuring means SM2 cooperates with the means PS2 to select circuits for control of the pressure effected by retarder RE2 to obtain the desired medium weight car leaving speed.

For a heavy weight car the weight information is stored at relay 1S1 and then at relay 1S2. Relay 1S1 selects speed selector relay 3PR of means PS1 to establish a desired initial pressure for retarder RE1, and storage relay 1S2 selects relay 3PR of means PS2 to establish a desired initial pressure for retarder RE2. The speed measuring means SM1 cooperates with the selective means PS1 to select circuits that control retarder RE1 to obtain the leaving speed of 9 miles per hour for this heavy car. Likewise the speed measuring means SM2 cooperates with selective means PS2 to select circuits that control retarder RE2 to obtain leaving speed of 7 miles per hour.

It was previously explained that under low temperature switching the relay SF is energized and picked up so that light, medium and heavy weight car informations are stored in the third and fourth storage relay groups.

The operation of the apparatus at this time is substantially the same except light weight storage relays 3F1 and 3F2 select the 4PR selector speed relays of means PS1 and PS2 and these relays together with the speed measuring means SM1 and SM2 select circuit arrangements in the selective means PS1 and PS2 which control the pressure effected at the retarder to obtain the desired leaving speed of 17 miles per hour for retarder RE1 and 15 miles per hour for retarder RE2.

The medium weight car information is now stored at relays 2F1 and 2F2 and the 5PR relays of the means PS1 and PS2 are energized and cooperate with the speed measuring means to select circuits of the networks that control the pressure of the retarders as required to obtain the desired medium car leaving speeds. Heavy weight car informations are stored at relays 1F1 and 1F2 and the 6PR relays of means PS1 and PS2 are selected and these relays cooperate with the speed measuring means to select prepared circuits in the networks that control the retarder pressures as needed to obtain the desired heavy car leaving speeds.

Assuming that while switching is being done under high temperature conditions and a light weight car occupies the second retarder section RE2, a second light weight car is humped and moves over the weight determining means WD, the energized condition of the storage relay 3S2 effected for the first car is not changed because relay 3S2 is energized at this time over its stick circuit completed at front contacts 90 and 91 of relays R2 and S. Thus the braking condition established for retarder RE2 for the first car is not disturbed by the weighing of this closely following second car. The weight of the second car is however stored at relay 3S1 in the usual manner and the first retarder section RE1 correspondingly controlled. That is to say, the weighing of a second car does not change the control established for a leading car that may still occupy the second retarder section. At the same time proper control is established for the following car.

It is apparent that when switching under low temperature conditions, the operation of the apparatus for closely following cars is substantially the same as just explained except the third and fourth storage relay groups are involved.

We shall next consider the case where a multiple car cut is humped under high temperature switching. Also that the leading car of this cut is of the light weight group and the second car of the cut is of the heavy weight group.

When the leading pair of wheels of the leading car of the cut rolls past the weight determining means WD, the light weight information is stored at relay 3S1 in the usual manner and corresponding braking control is effected as the head end of this car enters retarder RE1.

When the leading pair of wheels of the second car of the cut, a heavy weight car, rolls over the weight contactor WRC, the relays 20, 40, and 60 are picked up sequentially. This causes relay 20P to be first picked up and then released. When repeater relay 40P is picked up due to the closing of its pickup circuit at front contact 54 of relay 40. The repeater relay 60P cannot pick up when front contact 56 of relay 60 closes because its pickup circuit is at this time open at back contact 55 of relay R1 since the retarder RE1 is occupied by the leading car. When relay 40P picks up opening back contact 80, the stick circuit for storage relay 3S1 is opened and that relay releases. When relay 20 releases as the wheel of the heavy car recedes from the weighing point, the pickup circuit for storage relay 2S1 is closed at front contact 63 of relay 40P. With storage relay 2S1 picked up the control for the retarder RE1 is changed to that for a medium weight car. The weight storage information stored at relay 2S1 is then passed to relay 2S2 to continue this medium weight car control for retarder RE2.

In case the leading car of the cut is a heavy car and storage relay 1S1 is energized, and the second car of the cut is a medium or light weight car, the weight storage is changed to that for a medium weight car. Under this condition the stick circuit for storage relay 1S1 is opened at back contact 80 of relay 40P or back contact 81 of relay 20P when the second car is weighed. This causes relay 1S1 to release, followed by the release of relay 1S2. If the following car is of light weight, so that relay 40 is not energized, relay 40P is provided with an auxiliary pickup circuit which includes front contacts 155, 156, 157 and 158 of relays 2S2, 1S2, 2F2 and 1F2, in multiple, wire 159, back contact 160 of relay S, front contact 161 of relay R2, front contact 162 of relay 20 and front contact 163 of relay R1. This circuit assures that relay 40P is picked up, to establish corresponding medium weight control of the retarders, when the second and later cars of the cut are weighed if any are of the light weight group and the weight storage relay 2S1 (2F1) or 2S2 (2F2) is previously energized.

In the event all cars of a cut are heavy then relay 60P is energized during the weighing of following cars over its auxiliary pickup circuit including front contact 165 of relay 1F1 and front contact 166 of relay 1S1 in multiple, wire 167 and front contact 56 of relay 60, and the heavy car weight storage is retained.

From the foregoing description it is clear that apparatus embodying our invention has the advantages that cars are grouped according to weight and corresponding leaving speeds desirable for each weight group are automatically obtained at each of a plurality of retarder sections. Also cars are braked gradually and can be humped closely following each other without disturbing the desired leaving speed for each car. Multiple car cuts having cars of the different weight groups are handled by providing a preselected weight group speed selection for the retarders, as herein shown, the medium weight group. Also leaving speeds suitable for different weather conditions are assured.

Although we have herein shown and described but one form of car retarder speed control apparatus embodying our invention, it is to be understood that various changes and modifications may be made therein within the scope of the appended claims without departing from the spirit and scope of our invention.

Having thus described our invention, what we claim is:

1. In combination with a stretch of railway track equipped with a car retarder operable to exert different braking forces, a car weight determining means operable to different positions with an individual position for each of a plurality of different car weight groups, said weight determining means having connection to a track rail of the stretch at a point a selected distance in the approach to the retarder to determine by its position the weight group of a car as it approaches the retarder, a group of register relays one for each said car weight group with energizing connections selectively controlled by said positions of said weight determining means to briefly register by the relay of the group energized the weight group of the car approaching the retarder, a group of storage relays one for each said car weight group, a stick relay having an energizing circuit including a contact closed by said weight determining means when any car weight group is measured and another contact closed only when said retarder is unoccupied, said stick relay being held energized while said other contact remains closed, energizing cricuit means including contacts of said register relays with connections to the storage relays to store by the storage relay energized the car weight group as registered by the energized register relay, control circuit means including contacts of said storage relays with connections to the retarder to automatically establish prior to the car entering the retarder the braking force to be exerted initially by the retarder preselected according to the weight group of the car as stored by the energized storage relay, and stick circuit means including in multiple a contact closed in response to the car occupying the retarder and an energized position contact of said stick relay to retain energized a previosuly energized storage relay.

2. In combination with a stretch of railway track equipped with a car retarder having a first and a second section each independently operable to exert different braking forces according to the manner current is supplied thereto, a first and a second occupancy relay with connections to the first and second retarder sections respectively, and each relay operable to a first or a second position according as its section is not or is occupied by a car, a car weight determining means with an operatelement in the stretch at a point in the approach to the retarder to determine the weight of a car approaching the retarder, a first and a second storage relay means each operable to store car weight information according to the extent it is energized, pickup circuit means including contacts controlled by said weight determining means with connections to said first and second storage relay means to energize each said storage relay means to an extent predetermined according to the weight of a car approaching the retarder, a circuit network for each said retarder section, each said network with connections to the corresponding retarder section and including contacts of the storage relay means for the same sections to selectively control the manner current is supplied to the section according to the extent the storage relay means is energized, and two stick circuit means one for each said storage relay means, each said stick circuit means including a second position contact of the occupancy relay for the corresponding retarder section to retain energized the storage relay means to the extent previously energized while a car occupies the corresponding section, whereby car weight control for a closely following car can be established for the first section while a leading car occupies the second section and the weight control previously established for the leading car retained for the second section.

3. In combination with a stretch of railway track equipped with a car retarder having a first and a second section each independently operable to exert different braking forces according to the manner in which energy is supplied thereto, a first and a second occupancy relay with connections to the first and second retarder sections respectively, and each relay operable to a first or a second position according as its section is not or is occupied by a car, a car weight determining means having a plurality of contacts one for each of a plurality of different car weight groups, said weight determining means having an operating element in the stretch at a point in the approach to the retarder to determine by its contact closed the car weight group of a car approaching the retarder, a first and a second weight storage relay group, each said relay group having a different relay for each said car weight group, a first pickup circuit means including said contacts of said weight determining means with connections to said first storage relay group to store by the relay of that group energized the weight group of a car approaching the retarder, a second pickup circuit means including contacts of the relays of the first relay group with connections to the second storage relay group to energize the relay of the second group corresponding to the energized relay of the first group to further store the weight group of the car, a first and a second stick circuit means for said first and second storage relay groups, respectively, said first stick circuit means including a second position contact of said first occupancy relay to retain energized the previously energized relay of the first relay group while the car occupies the first retarder section, said second stick circuit means including a second position contact of said second occupancy relay to retain energized the previously energized relay of the second relay group while the car occupies the second retarder section, a first circuit network including contacts of the first storage relay group with connections to the first retarder section to control the manner energy is supplied thereto and establish a braking force for that section preselected according to the weight group of the car, and a second circuit network including contacts of the second storage relay group with connections to the second retarder section to control the manner energy is supplied thereto and establish a braking force for the second section preselected according to the weight group of the car.

4. In combination with a stretch of railway track equipped with a car retarder having a first and a second section each independently operable to exert different braking forces according to the manner in which energy is supplied thereto, a first and a second occupancy relay with connections to the first and second retarder sections respectively, and each relay operable to a first or a second position according as its section is not or is occupied by a car, a car weight determining means having a plurality of contacts one for each of a plurality of different car weight groups, said weight determining means having an operating element in the stretch at a point in the approach to the retarder to determine by its contact closed the car weight group of a car approaching the retarder, a first and a second weight storage relay group, each said relay group having a different relay for each said car weight group, a pickup circuit means including said contacts of said weight determining means and having connections to the relays of said first and second storage relay groups to store the weight group information of a car approaching the retarder by energizing the corresponding relay of each said storage relay groups, a first and a second stick circuit means for said first and second storage relay groups respectively, said first stick circuit means including a second position contact of said first occupancy relay to retain energized the previously energized relay of the first relay group while the car passes through the first retarder section, said second stick circuit means including a second position contact of said second occupancy relay to retain energized the previously energized relay of the second storage relay group while the car passes through the second retarder section, a first circuit network including contacts of the first storage relay group with connections to the first retarder section to control the manner energy is supplied thereto and establish a braking force for that section preselected according to the weight group of the car, and a second circuit network including contacts of the second storage relay group with connections to the second retarder section to control the manner energy is supplied thereto and establish a braking force for the second section preselected according to the weight group of the car.

5. In a railway car weight information storage means the combination comprising, a car weight determining means having an operating element disposed at a given point of a stretch of railway track over which cars move in a given direction and a plurality of car weight measuring relays one for each of a plurality of different car weight groups, said measuring relays being energized selectively according to the weight group of a car as each pair of wheels of the car passes the operating element, a group of register relays one for each said car weight group, each of said register relays having an energizing circuit which includes an energized position contact of the measuring relay for the corresponding car weight group, a group of weight information storage relays one for each of the different car weight groups, an occupancy relay having connections to a section of the stretch beyond said given point and operable to a first or a second position according as the section is not or is occupied by a car, a stick relay controlled jointly by said weight determining means and a first position contact of said occupancy relay, said stick relay being held energized by said occupancy relay first position contact, an energizing circuit for each said storage relay including an energized position contact of the register relay for the corresponding car weight group and a zero position contact of said weight determining means, and a stick circuit for each storage relay including in multiple a second position contact of said occupancy relay and an energized position contact of said stick relay.

6. In a railway car weight information storage means for a stretch of track having a first and a second section over which cars move in a given direction the combination comprising, a car weight determining means having an operating element disposed in the stretch at a point in the approach to the sections and a plurality of car weight measuring relays one for each of a plurality of different car weight groups, said measuring relays being energized and picked up selectively according to the weight group of a car passing over the operating element, a group of register relays one for each said car weight groups, each said register relays having an energizing circuit which includes a front contact of the measuring relay for the corresponding car weight group, a first and a second group of weight information storage relays, each said storage relay group energizable to a different extent for each of said car weight groups, a first and a second occupancy relay with connections to the first and second sections respectively, and each occupancy relay operable to a first or a second position according as its section is not or is occupied by a car, a stick relay controlled by the weight determining means and a first position contact of said first occupancy relay, pickup circuit means including contacts of the register relays with connections to said first and second storage relay groups to energize each storage relay group to an extent corresponding to the energized register relay, a first stick circuit means including a second position contact of said first occupancy relay with connections to the relays of said first storage relay group to retain energized that group at the extent previously energized, said first stick circuit means also including a contact of said stick relay to retain said first storage group energized at the extent previously energized while the car passes from the operating element to the sections, and a second stick circuit means including a second position contact of said second occupancy relay with connections to the relays of said second storage relay group to retain energized that group at the extent previously energized, whereby the weight information of a first car is retained until the car leaves the second section and a new weight information for a second car can be stored while the first car occupies the second section.

7. In a railway car weight information storage means for a stretch of railway track over which multiple car cuts and closely spaced single car cuts move in a given direction and which stretch is provided with a first and a second car retarder section, the combination comprising, a car weight determining means having an operating element mounted in the stretch in the approach to the retarder sections and provided with a contact which is closed in response to a car exceeding a given weight, a first and a second occupancy relay having connections to the first and second retarder sections respectively, and each operable to a first or a second position according as its section is not or is occupied by a car, a car cut differentiating relay having a pickup circuit including in series a first position contact of said first occupancy relay and a second position contact of said second occupancy relay for energizing the relay for single car cuts and deenergizing the relay for multiple car cuts which occupy both sections simultaneously, a stick circuit for said differentiating relay including a second position contact of said second occupancy relay, a first and a second weight information storage relay for the first and second retarder sections respectively, a pickup circuit means for said first storage relay including said contact of the weight determining means, a stick circuit for said first storage relay including a second position contact of the first occupancy relay, a pickup circuit including a front contact of the first storage relay with connections to the second storage relay to energize that relay, said last mentioned pickup circuit having two alternate paths one of which includes a back contact of said differentiating relay and a first position contact of said second occupancy relay in series and a second one of which path includes a back contact of the differentiating relay and a second position contact of said second occupancy relay in series, a stick circuit for said second storage relay including a second position contact of said second occupancy relay and a front contact of said differentiating relay in series, and a control circuit for each said retarder section and each of which control circuits includes contacts of the corresponding storage relay.

8. In combination with a stretch or railway track over which multiples car cuts comprising cars of different car weight groups move in a given direction and which is equipped with a car retarder operable to exert different braking forces according to the manner current is supplied thereto, a car weight determining means having a plurality of different contacts one for each of the different car weight groups and including an operating element mounted in the stretch in the approach to the retarder to measure by its contact closed the weight group of each car of a multiple car cut approaching the retarder, a storage relay group having a different relay for each of the different car weight groups, circuit means including said contacts of said weight determining means with connections to said storage relay group to store by the relay energized the weight group information of each car of a multiple car cut, other circuit means including contacts controlled by said car weight determining means with connections to the storage relay group to energize a preselected one of the relays when a car of a multple car cut of a weight group different from that of the leading car of the cut is weighed, and still other circuit means including contacts of the storage relays with connections to said retarder to selectively control the manner current is supplied to the retarder according to the energized relay of the storage relay group.

9. In combination with a stretch of railway track equipped with a car retarder operable to exert different braking forces according to which of its control circuits current is supplied and a car speed measuring means operable to measure the speed of a car passing through the retarder, a car weight determining means having a plurality of different contacts one for each of a plurality of different car weight groups, said car weight determining means having an operating element mounted in the stretch at a point in the approach to the retarder to determine by its contact closed the car weight group of a car approaching the retarder, a group of register relays one for each said car weight group with connections selectively controlled by said contacts of said weight determining means to briefly register by the relay energized the weight group of the car approaching the retarder, a group of storage relays one for each car weight group, a stick relay having an energizing circuit including a contact closed by said weight determining means when any car weight group is measured and another contact closed only when said retarder is unoccupied, said stick relay being held energized while said other contact remains closed, energizing circuit means including contacts of said register relays and a contact closed when said weight determining means is not actuated and having connections to the storage relays to selectively energize a storage relay to store the car weight group as registered by the energized register relay, stick circuit means including in multiple an energized position contact of said stick relay and a contact closed when said retarder is occupied and having connections to retain energized the storage relay previously energized, and other circuit means including contacts of said storage relays and contacts of the speed measuring means and having connections to the retarder control circuits for selectively supplying current to the retarder control circuits to establish retarder braking forces which effect a preselected leaving speed, different for each said car weight group.

10. In combination with a stretch of railway track equipped with a car retarder and a car speed measuring means, the retarder being operable to exert different braking forces according to which of its control circuits current is supplied and said speed measuring means having different circuit controlling contacts and operable to measure by its contacts closed the speed of a car passing through the retarder, a car weight determining means having different normally open circuit controlling contacts one for each of a plurality of different car weight groups, said weight determining means having operating connections to a rail of the stretch at a point a selected distance in the approach to the retarder to determine by its contact closed the weight group of a car approaching the retarder, an occupancy relay with connections to said stretch and operated to a first or a second position according as the retarder is not or is occupied by a car, a group of register relays one for each said car weight group with connections selectively controlled by said contacts of said weight determining means to briefly register by the relay energized the weight group of the car approaching the retarder, a group of storage relays one for each car weight group, a stick relay having an energizing circuit including an actuated position contact of said weight determining means and a first position contact of said occupancy relay and a stick circuit including said occupancy relay first position contact, energizing circuit means including contacts of said register relays and a contact closed when said weight determining means is not actuated with connections to the storage relays to selectively energize a storage relay to store the car weight group as registered by the energized register relay, a stick circuit means having a first path including in multiple a second position contact of said occupancy relay and an energize position contact of said stick relay and a second path including another actuated position contact of said weight determining means, said stick circuit means having connections to said storage relay group to retain energized a previously energized relay while the car approaches and occupies the retarder, a braking force and leaving speed selective means including a series of leaving speed selective relays one for each of said car weight groups and a circuit network having preselected circuit arrangements, with connections to the retarder control circuits for supplying current thereto, and circuit means including contacts of said storage relay group and contacts of the speed measuring means with connections to said leaving speed relays and said circuit network for automatically selecting circuit arrangements which establishes prior to a car entering the retarder an initial braking force preselected different for each car weight group and for automatically obtaining a leaving speed preselected different for each car weight group.

11. In combination with a stretch of railway track over which multiple car cuts comprising cars of different car weight groups move in a given direction and which is equipped with a car retarder operable to exert different braking forces according to the manner current is supplied thereto, a car weight determining means having a plurality of different contacts one for each of the different car weight groups and including an operating element mounted in the stretch in the approach to the retarder to measure by its contact closed the weight group of each car of a multiple car cut approaching the retarder, a group of register relays one for each said car weight group with connections selectively controlled by said contacts of said weight determining means to briefly register by the relay energized the weight group of each car while approaching the retarder if successive cars are of like weight groups, a storage relay group having a different relay for each of the different car weight groups, circuit means including contacts of said register relays with connections to the storage relays to selectively energize a storage relay to store the car weight group as registered by the energized register relay for each car of a multiple car cut, auxiliary circuit means including other contacts controlled by said weight determining means and contacts of said storage relays to energize a preselected one of said register relays when a car of a multiple car cut of a weight group different from that of the preceding cars is weighed, and still other circuit means including contacts of the storage relays with connections to said retarder to selectively control the manner current is supplied to the retarder according to the energized relay of the storage relay group.

12. In combination with a stretch of railway track over which multiple car cuts comprising cars of different car weight groups move in a given direction and which is equipped with a car retarder operable to exert different braking forces according to the manner current is supplied thereto, a car weight determining means operable to close different contact for light, medium, and heavy weight cars and having a normally closed zero position contact, said weight determining means having an operating element mounted in the stretch in the approach to the retarder to classify by its contact closed each car of a multiple car cut approaching the retarder as being of light, medium, or heavy weight; a group of register relays one for each car weight with connections selectively controlled by the light, medium, and heavy weight contacts of said weight determining means to briefly register by the relay energized the light, medium, or heavy weight of each car while approaching the retarder if successive cars are of light weight; a light, a medium, and a heavy weight storage relay; circuit means including contacts of said register relays and said zero position contact with connections to said storage relays to selectively energize said storage relays to store the car weight as registered by the energized register relay, auxiliary circuit means including a light weight contact of said weight determining means and contacts closed in response to the energization of said medium and said heavy weight storage relays to energize the medium weight register relay when a car of a multiple car cut having a lighter weight classification than the preceding cars is weighed, and still other circuit means including contacts of the storage relays with connections to said retarder to selectively control the manner current is supplied to the retarder according to the energized relay of the storage relay group.

13. In combination with a stretch of railway track over which multiple car cuts move in a given direction and which is provided with a car retarder operable to exert different braking forces according to the manner current is supplied thereto, a car weight determining means having a plurality of contacts one for each of a plurality of car weight groups and including an operating element mounted in said stretch in the approach to said retarder to measure by the contact closed the weight group of each car approaching said retarder, a storage relay group energizable to a plurality of conditions, circuit means including said contacts of said weight determining means having connections to said storage relay group to store by the energized condition thereof the weight group information of each car of a multiple car cut, auxiliary circuit means including contacts controlled by said weight determining means and having connections to energize said storage relay group in a preselected condition when a car of a weight group different from that of the leading car of the multiple car cut is weighed, and control circuit means including contacts of the storage relays and having connections to said retarder for selectively controlling the manner current is supplied thereon in accordance with the energized condition of said storage relay group.

14. In combination with a stretch of railway track over which multiple car cuts move in a given direction and which is provided with a car retarder operable to exert different braking forces according to the manner current is supplied thereto, a car weight determining means having a plurality of contacts one for each of a plurality of car weight groups and including an operating element mounted in said stretch in the approach to said retarder to measure by the contact closed the weight group of each car approaching said retarder, a group of register relays one for each car weight group, a first energizing circuit arrangement including contacts of said weight determining means and having connections to said register relays to energize one of said register relays for each car of a multiple car cut approaching said retarder in accordance with the measured weight group of the car if the successive cars are of the same weight group, a storage relay group energizable to a plurality of conditions one for each weight group, circuit means including contacts of said register relays and having connections to said storage relay group to selectively establish one of said energized conditions to store the weight group then registered in said reigster relay group, an auxiliary energizing circuit arrangement including other contacts controlled by said weight determining means and contacts of said storage relays and having connections to said register relay group to energize a preselected one of said register relays when a car of a multiple car cut has a measured weight group different from that of the preceding cars, and control circuit means including other contacts of the storage relays and having connections to said retarder for selectively controlling the manner current is supplied thereto in accordance with the energized condition of said storage relay group.

15. In combination with a stretch of railway track equipped with a car retarder having a plurality of successive sections, each section being independently operable to exert different braking forces according to the manner current is supplied thereto, an occupancy relay for each retarder section having connections to the associated section and operable to a first and a second position as the associated section respectively is not and is occupied by a car, a car weight determining means with an operating element in said stretch at a point in the approach to said retarder for determining the weight group of an approaching car, a storage relay means for each retarder section operable to store car weight group information according to the extent the relay means is energized, eenrgizing circuit means including contacts controlled by said weight determining means and having connections for energizing each said storage relay means to an extent predetermined according to the weight group of a car approaching said retarder, a control circuit network for each retarder section, each said control network having connections to the associated retarder section and including contacts of the corresponding storage relay means to selectively control the manner in which current is supplied to said associated section according to the extent to which said corresponding storage relay means is energized, and a stick circuit means for each storage relay means including a second position contact of the associated occupancy relay for the corresponding retarder section and having connections to retain energized the associated storage relay means in the extent previously energized while a car occupies the corresponding section, whereby weight group control of a leading retarder section can be established for a closely following car while a preceding car occupies a succeeding section and the weight group control of the succeeding section previously established for the preceding car is retained.

16. A car retarder control system comprising in combination, a stretch of railway track including a plurality of successive car retarders, each retarder being operable to a plurality of different braking conditions, retarder control means for each retarder operable to actuate that retarder selectively to different braking conditions in accordance with a plurality of different parameters indicative of the braking requirements for each car passing through the associated retarder, storage means for each retarder for storing a particular one of said parameters for each car until after that car has passed through that retarder, each storage means acting upon the associated retarder control means for the associated retarder, means for determining said particular parameter and for storing said parameter in said storage means associated with the first of said retarders in response to the presence of a car in approach of said first retarder, and transfer means for transferring the storage of said particular parameter from said storage means for said first retarder to said storage means for a successive retarder prior to the entry of said car into said successive retarder.

References Cited by the Examiner
UNITED STATES PATENTS

| | | | |
|---|---|---|---|
| 1,766,539 | 6/30 | Prescott | 104—26 X |
| 2,022,086 | 11/35 | Livingston | 303—20 |
| 2,045,989 | 6/36 | Livingston | 303—20 |
| 2,122,358 | 6/38 | Preston | 246—2 |
| 2,194,352 | 3/40 | Brixner | 246—2 |
| 2,206,550 | 7/40 | Mordin | 246—2 X |
| 2,331,125 | 10/43 | Logan | 303—21 |
| 2,669,489 | 2/54 | Kuhn | 303—21 |
| 2,700,728 | 1/55 | Brixner | 104—26 X |
| 2,806,685 | 9/57 | Sande. | |

LEO QUACKENBUSH, *Primary Examiner.*

SIMON SIPERSTEIN, *Examiner.*